INVENTOR
ALFRED ERWIN REGINALD ARNOT
BY
Shoemaker and Mattare
ATTORNEY

July 8, 1969 A. E. R. ARNOT 3,453,673
TOOLS
Filed Feb. 1, 1966

INVENTOR
ALFRED ERWIN REGINALD ARNOT
BY
Shoemaker and Mattare
ATTORNEYS

INVENTOR
ALFRED ERWIN REGINALD ARNOT
BY
Shoemaker and Mattare
ATTORNEY

INVENTOR
ALFRED ERWIN REGINALD ARNOT
BY
Shoemaker and Mattare
ATTORNEYS

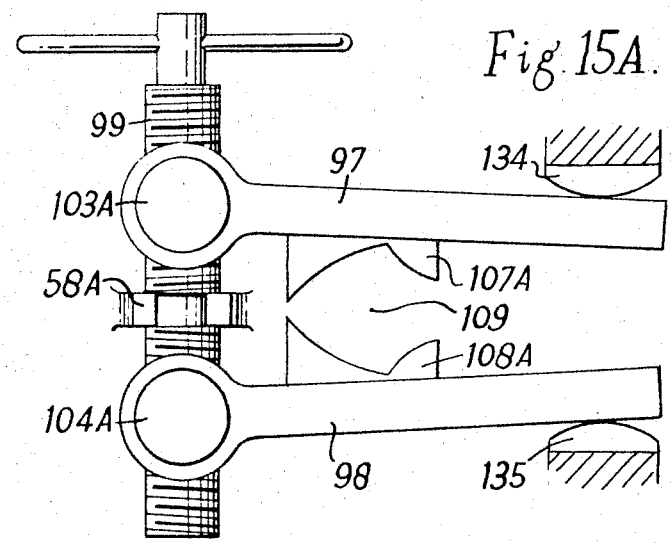
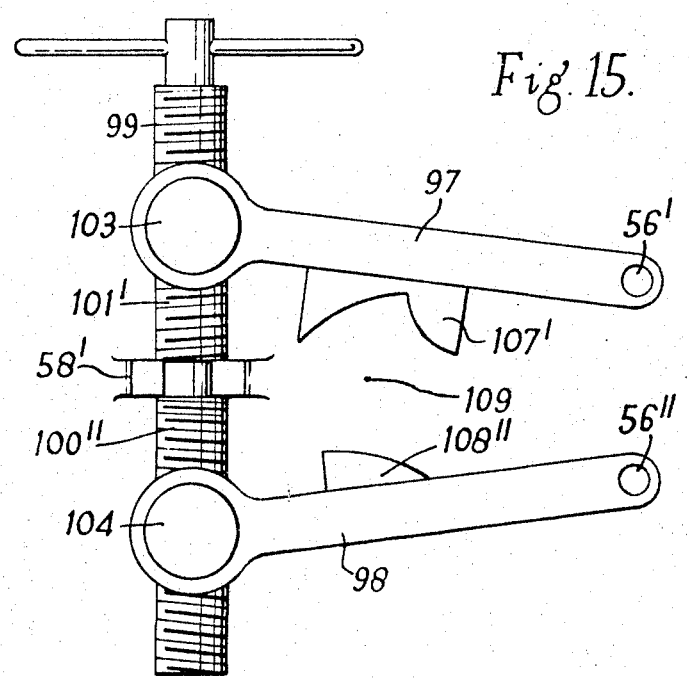

United States Patent Office 3,453,673
Patented July 8, 1969

3,453,673
TOOLS
Alfred Erwin Reginald Arnot, The Bell House, Baughurst, near Basingstoke, Hampshire, England
Filed Feb. 1, 1966, Ser. No. 524,342
Int. Cl. B23g 1/24, 1/00
U.S. Cl. 10—89
15 Claims

ABSTRACT OF THE DISCLOSURE

A drive-transmission for rotary screw-threading tools which employs a tubular tool-locating-member of non-circular internal cross-section driven by any of a plurality of gears, including high-torque and high-speed reversing gears, through a worm and worm-wheel. A screw-threaded body engaged with one end of the tool-locating member can assist in engaging a die in the tool-locating member with a workpiece held in a self-centring clamp on the drive-transmission. The drive-transmission is adapted to co-operate with a mounting block for assembly in two configurations.

---

This invention relates to portable tools and accessories therefor, and particularly but not exclusively to drive-transmissions of the type disclosed in United Kingdom specification No. 998,001. Such drive-transmissions comprise in general a frame having a bearing carrying a rotary tool-locating member which may in operation be rotated through gearing in the frame either manually or by, for instance, a portable electric motor. The frame of such a drive-transmission may have mounted thereon a vice for holding a cylindrical workpiece fixed in relation to the frame during a screw-threading operation.

According to a first aspect of the invention, a drive-transmission for screw-threading-tools comprises a frame, a bearing in the frame, a rotary tool-locating-member carried by the bearing, and a plurality of input shafts journalled in the frame and respectively associated with gearing to the tool-locating-member for rotation thereof, including a forward gear, a high-torque reversing gear and a high-speed reversing gear.

According to a second aspect of the present invention, a drive-transmission for screw-threading-tools comprises a frame, a bearing in the frame, and a tubular rotary tool-locating member having its internal cross-section substantially in the form of the common boundary of a plurality of superposed non-circular figures, the tool-locating member being carried by the bearing and associated with gearing for rotation thereof. For example, the internal cross-section may be in the form of the common boundary of a square and a hexagon which have been superposed, the sizes of the square and the hexagon being such that a standard-size square die and a standard-size hexagonal die can fit into the tool-locating member. The figures may be superposed concentrically for example where the figures are squares of different sizes, the diagonals of both squares may intersect at the same point. Alternatively, the figures which are superposed may have their centres offset from one another.

According to a third aspect of the present invention, a drive transmission for screw-threading-tools comprises a frame, a bearing in the frame, a hollow rotary tool-locating member which is open at both ends and is carried in the bearing, gearing for rotation of the tool-locating member and a screw-threaded body screw-threaded on one end of the tool-locating member and having an abutment means providing for abutment in a plane perpendicular to the axis of the screw-thread on the body and facing the other end of the tool-locating member.

For example, the screw-threaded body may be in the form of a plug with an external screw thread on one end, the tool-locating member being in this case screw threaded internally, and ending in a plane surface perpendicular to the axis of the screw thread. When the tool-locating member is rotating in an appropriate sense, the plug will, if restrained from rotating with the tool-locating member, advance into the latter. A screw-threading tool, such as a die, located in the tool-locating member and having an appropriate screw-thread-cutting sense can be urged by the plug into cutting engagement with a workpiece. The screw-thread-cutting sense of the tool must be the opposite sense to the screw thread on the plug and the tool-locating member, for example, if the screw thread on the plug is left handed, the screw-thread-cutting sense of the tool must be right hand.

According to a fourth aspect of the present invention a drive-transmission for rotary tools comprises a frame having a bearing carrying a rotary tool-locating member, an input shaft journalled in the frame, gearing to the tool-locating member associated with the input shaft for rotation of the tool-locating member, the drive-transmission being assembled on a mounting block secured to the frame in one position selected from at least two positions at which the frame is adapted to receive the block, the mounting block having formed therein two substantially cylindrical holes extending into the block and towards the face of the block immediately adjacent the frame, and a pair of rigid leg members engaged respectively in the holes, the holes being such that the leg members diverge from one another outwardly of the block and one of the leg members having a base member adapted to stabilise the assembly when stood on the ground.

According to a fifth aspect of the present invention, a mounting block for a rotary tool has formed therein two substantially cylindrical and converging holes and the block includes means for locating a rotary tool thereon.

According to a sixth aspect of the invention, a mounting block adapted to receive a rotary tool in a given position thereon also has a cluster of four holes extending into the block from one side thereof with their axes inclined to one another and the mouths of the holes at the said side lying at the corners of a quadrilateral.

According to a seventh aspect of the present invention, a workpiece clamp for clamping workpieces of circular cross-section comprises a frame, two arms, each arm being mounted for rotation on a pivot secured at a fixed location on the frame and having a fixed datum position of closest approach to the other arm, means secured on the frame which are adapted to rotate the arms simultaneously towards each other and to provide a range of limits to the respective angular separations of the arms from their datum positions, a first clamping jaw on one of the arms having a profile in the form of a pair of lines diverging towards a second jaw on the other arm, the lines being substantially such that from any one of a plurality of points on an arc centred on the pivot of the said one arm normals can be drawn to two points, one on each line, equidistant from the point on the arc, the arc passing through a datum point fixed relative to the frame, the profile of the second clamping jaw being such that for a range of angular separation of the arms a circle centred on the datum point and touched by the divergent lines is touched by the profile of the second clamping jaw at a point which lies at the apex of a triangle whose base is the line joining the points of contact with the circle of the divergent lines, none of the angles of the triangle being obtuse.

According to an eighth aspect of the present invention, a workpiece clamp for clamping workpieces of circular cross-section comprises a frame, two rotatable arms each having a fixed datum position of closest approach to the other arm, means secured on the frame and adapted to rotate the arms towards each other about respective pivots which are so translated in opposite directions along a straight line fixed relative to the frame as to separate from each other as the arms are rotated towards each other, a first clamping jaw on one of the arms having a profile in the form of a pair of lines diverging towards a second jaw on the other arm, the diverging lines and the profile of the second clamping jaw being such that for a range of angular separation of the arms a circle centred on a datum point fixed relative to the frame touches the diverging lines and the profile of the second clamping jaw, at three respective points, the three points lying at the apices of a triangle none of the angles of which are obtuse.

According to a ninth aspect of the present invention, a saw-mechanism comprises a frame, a holder adapted to secure a saw, a guide rotatably mounted on the frame about an axis at right-angles to the saw and adapted to allow reciprocatory translation therein of the saw holder, a rotary member mounted for rotation in the frame, a cam coupled to the rotary member for rotation thereby, a cam-follower engaging the cam and secured to the saw holder, and means for maintaining the cam follower in contact with the cam, rotation of the cam causing the cam-follower to effect reciprocatory translation of the saw holder relative to the guide.

The various aspects of the present invention will be further described by way of example with reference to the accompanying drawings in which:

FIGURE 3 is a side view taken in the direction of an arrow 3' in FIGURE 1,

Figure 6:
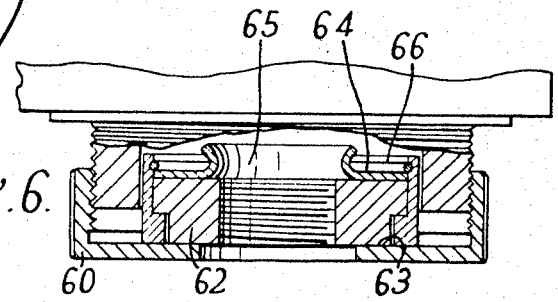
Figure 7:
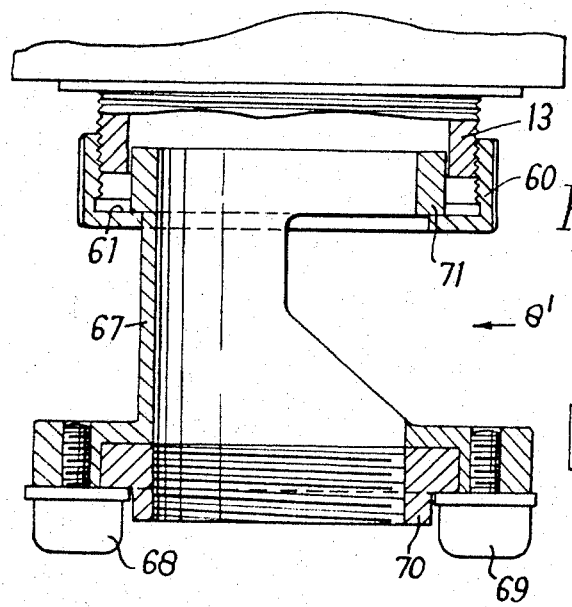
Figure 8:
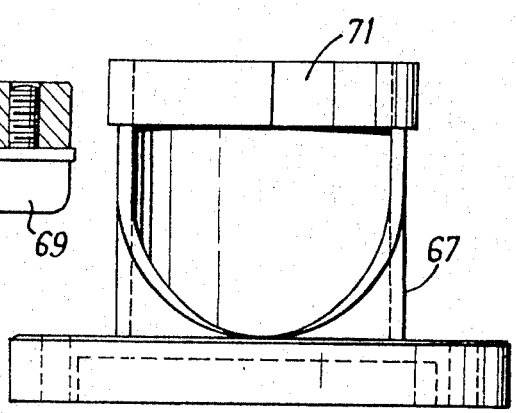
Figure 9:
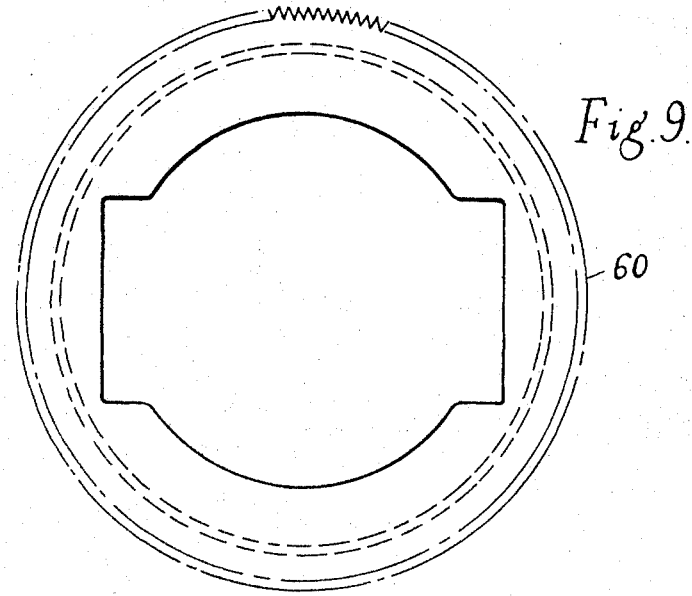
Figure 10:
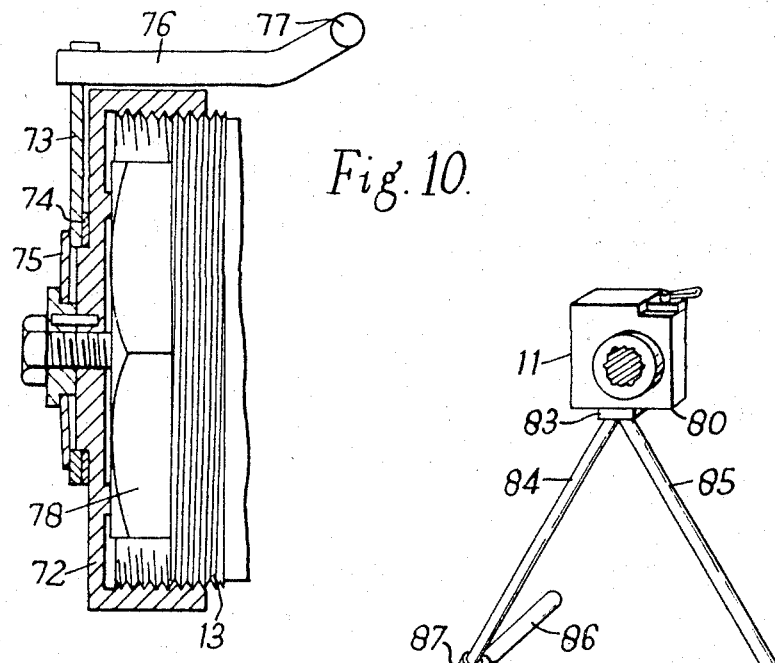

FIGURE 6 is an axial section through a screw-threaded body engaged with a tool-locating member in which a screw-thread-cutting tool is located, FIGURE 7 is an axial section of an extension die-holder, FIGURE 8 is a side view of the extension die-holder of FIGURE 7, FIGURE 9 is a plan view of a screw-threaded body, FIGURE 10 is an axial section of a further screw-threaded body engaged with a tool-locating member in which a screw-thread-cutting tool is located.

Figure 11:
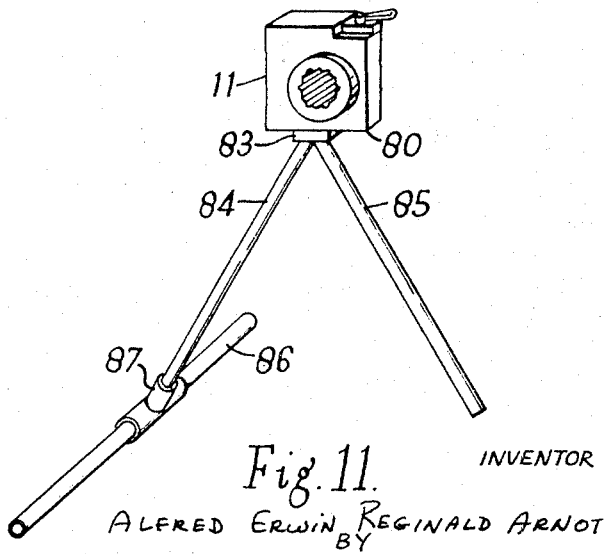
Figure 12:
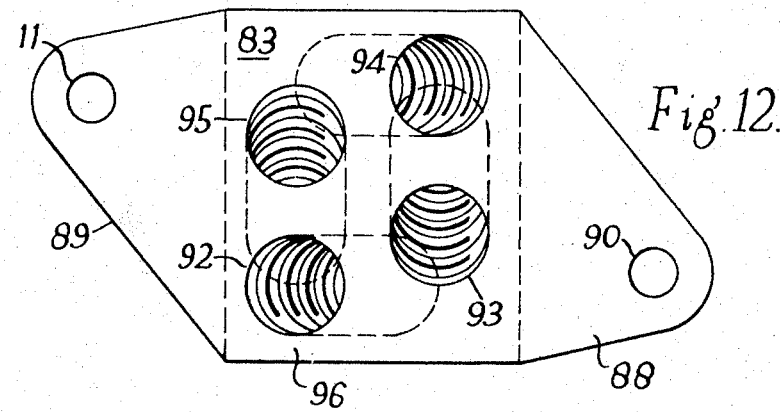
Figure 13:
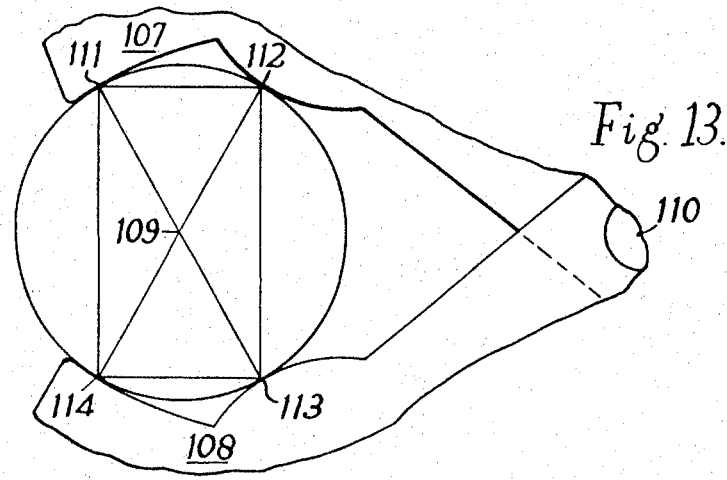
Figure 14:
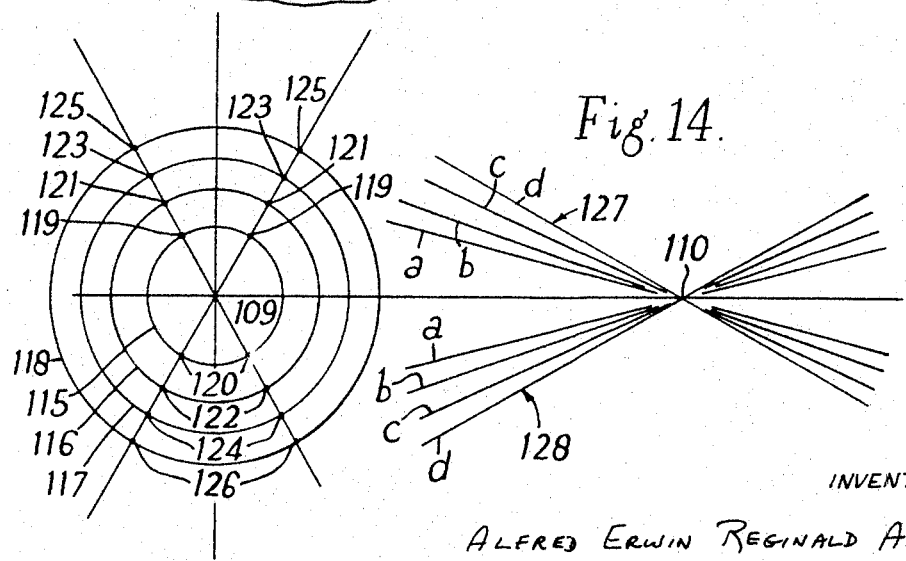
Figure 16:
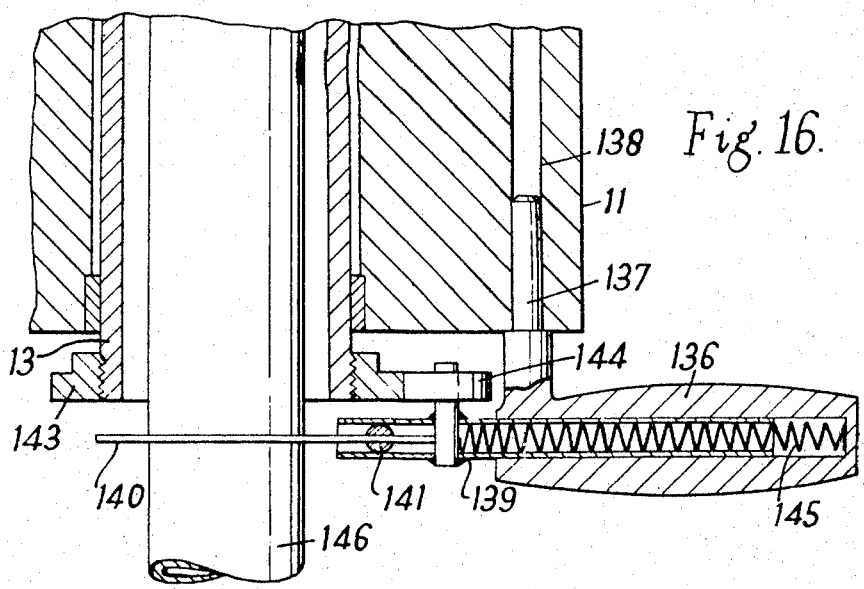
Figure 17:
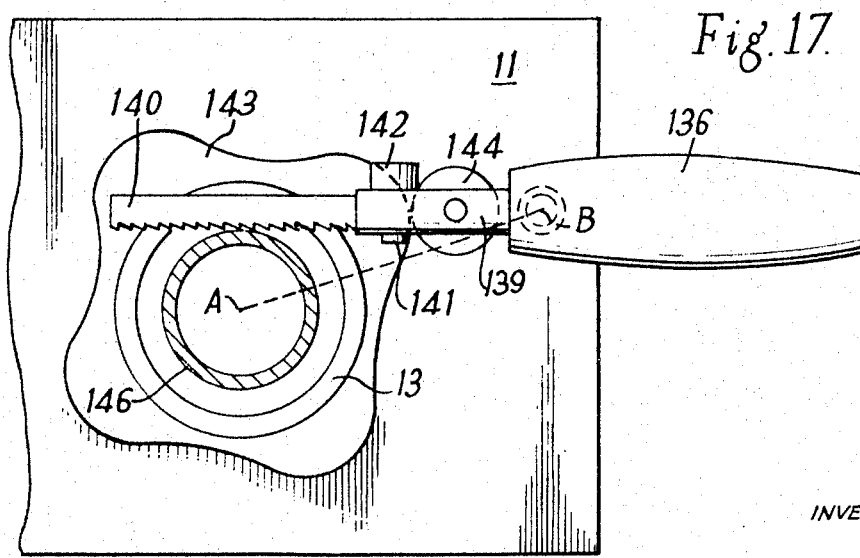

FIGURE 11 is a simplified perspective view of a drive-transmission for rotary tools mounted on a supporting assembly, FIGURE 12 is a plan view of a mounting block, FIGURE 13 is a diagram illustrating the clamping of a cylindrical workpiece in a self-centring vice, FIGURE 14 is a diagram for use in plotting vice-jaw profiles for a self-centring vice, FIGURE 15 is a schematic side view of a self-centring vice, FIGURE 15A is a schematic side view of a further self-centring vice, FIGURE 16 is a sectional view of a saw-mechanism, and FIGURE 17 is a side view of the saw-mechanism of FIGURE 16.

Figure 1:
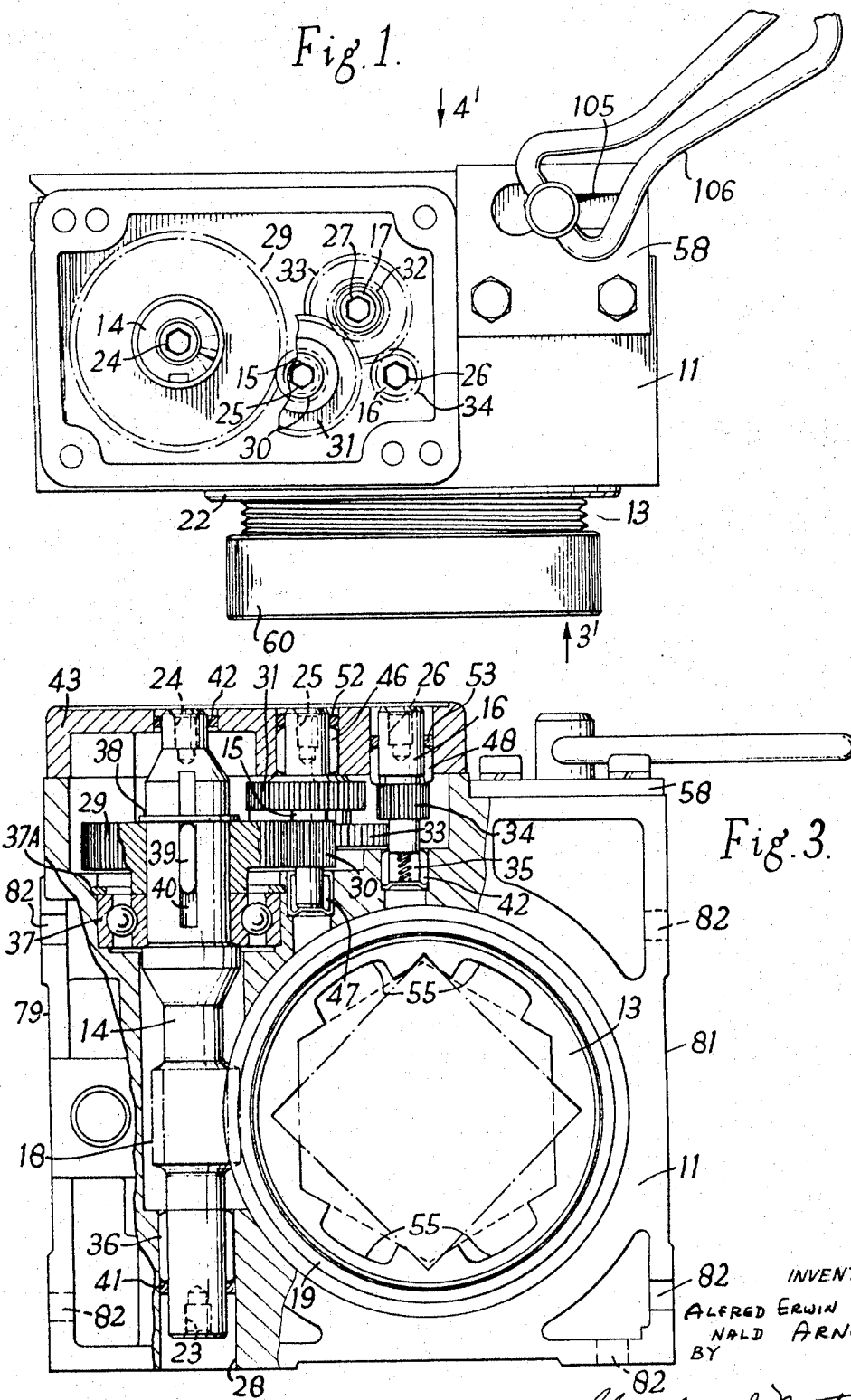
FIGURE 1 is a plan view of a drive transmission for rotary tools.
Figure 2:
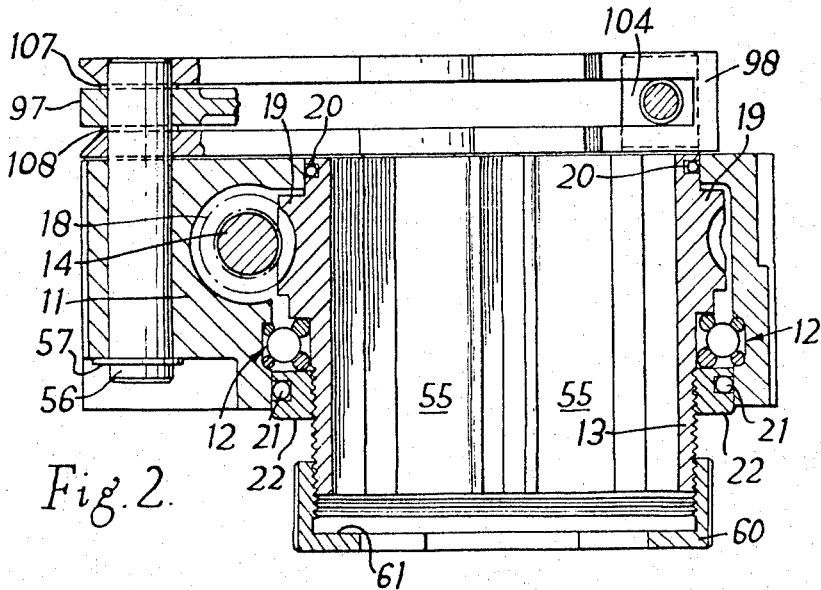
FIGURE 2 is a horizontal section of the drive transmission shown in FIGURE 1.

Referring to FIGURES 1 and 2, there is shown a drive transmission for rotary tools comprising a frame 11 of aluminium alloy in which a wire-race ball bearing 12 carries a tubular rotary tool-locating member 13. In operation, drive can be transmitted from any one of a plurality of input shafts 14, 15, 16 and 17 to the tool-locating member 13 through a worm 18 on the input shaft 14 and an annular wormwheel 19 coaxially secured on the tubular rotary tool-locating member 13. An O-ring 20 located in a circular groove in the cylindrical outer surface of the tool-locating member 13, and a sealing ring 21 located in a groove in the cylindrical outer surface of an annular collar 22 in screw-threaded engagement with the tool-locating member 13 bear against the frame 11.

Figure 4:
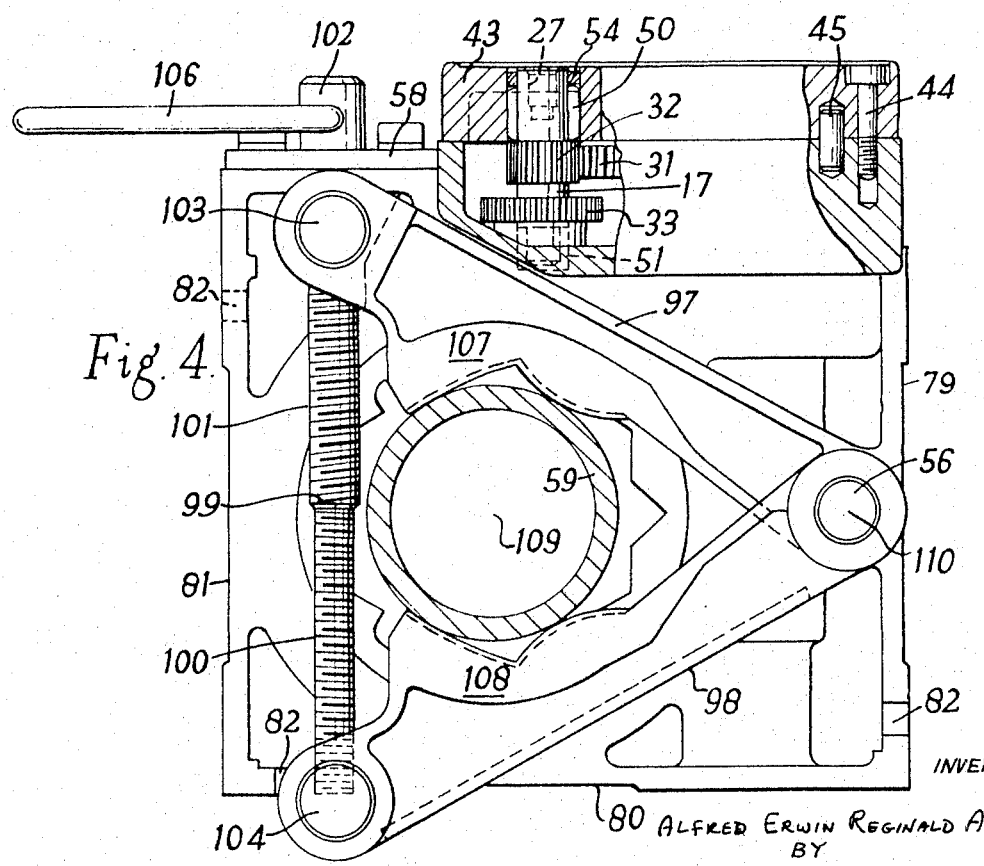
FIGURE 4 is a side view taken in the direction of an arrow 4' in FIGURE 1.

Referring to FIGURES 3 and 4, it will be seen that the outer ends of the input shafts 15, 16 and 17 are formed with respective coaxial hexagonal recesses 25, 26 and 27. The input shaft 14 extends through the frame 11 to an aperature 28 and is formed with a coaxial hexagonal recess 23 at its end in the aperture 28 and with a coaxial hexagonal recess 24 at its end adjacent the input shafts 15, 16 and 17. The hexagonal recesses 23, 24, 25, 25 and 27 are the same size. A key, not shown, of hexagonal cross-section is provided to fit the recesses 23–27 and hence locates concentrically in a three-jaw chuck of a portable electric drill without circumferential slip.

Each input shaft is respectively associated with gearing to the tool-locating member 13: the input shaft 14 can transmit drive through the worm 18 and the wormwheel 19; the input shaft 15, 16 and 17 can transmit drive through the input shaft 14 by way of a pinion 29. Two pinions 30 and 31 are secured to the input shaft 15 for rotation coaxially therewith. The pinion 30 is constantly in mesh with the pinion 29. Two pinions 32 and 33 are secured to the input shaft 17 for rotation coaxially therewith. The pinion 32 is constantly in mesh with the pinion 31. A single pinion 34 is secured to the input shaft 16 for rotation coaxially therewith. A helical spring 35 so urges the input shaft 16 that the pinion 33 remains out of mesh with the pinion 33 unless the input shaft 16 is pressed into the frame sufficiently strongly to overcome the spring 35.

When the pinion 34 is enmeshed with the pinion 33, the input shaft 16 is coupled to the tool-locating member 13 through a high-torque gear formed by the pinions 34, 33, 32, 31, 30 and 29 together with the worm 18 and the wormwheel 19.

The input shaft 14 is journalled in the frame 11 by a bearing 36 and a ball bearing 37. The pinion 29 is secured on the shaft 14 between the ball bearing 37 and a circlip 38 by a key 39 located in a keyway 40 in the shaft 14. The ball bearing 37 is held in place by a circlip 37A. A rubber sealing ring 41 co-operates with one end of the shaft 14 in sealing the bottom of the aperture 28. The other end of the shaft co-operates with a rubber sealing ring 42 in sealing an aperture in a cover 43 (omitted from FIGURE 1) secured on the main body of the frame 11 by a bolt 44 and a pin 45. The input shafts 15, 16 and 17 are journalled in the frame 11 by means of respective pairs of bearings 46 and 47, 48 and 49, and 50 and 51. Rubber sealing rings 52, 53 and 54 co-operate with the input shafts 15, 16 and 17 respectively in sealing the respective apertures in the cover 43.

In a screw-threading operation for cutting a right-hand screw thread, a right-hand screw-threading tool is located coaxially within the tool-locating member 13 and a clockwise drive applied to the recess 26 enmeshing the pinions 34 and 33 to provide a high-torque forward gear to the tool-locating member 13 for starting the cutting of a screw thread. After the screw thread to be cut has been satisfactorily started, the clockwise drive may be transferred to the recess 25 or 23 to provide a medium or high-speed forward gear respectively if required.

When a screw thread has been cut, the screw-threading tool can be unscrewed from the screw-thread by applying the clockwise drive initially to the recess 27 to provide a high-torque reversing gear for "breaking the chip," then transferring the clockwise drive to the recess 24 to provide a high-speed reversing gear for rapid removal of the screwing tool.

Referring to FIGURES 2 and 3 it will be seen that the tubular tool-locating member 13 has an internal cross-section substantially in the form of the common boundary of a plurality of superposed noncircular figures, one of which is a square which is shown completed in chain dotted lines and another is a hexagon which is shown completed in broken lines. The sizes of the square and hexagon are such that standard square and hexagonal dies will fit into the tubular tool-locating member 13.

Four broad grooves 55 are formed to provide axial guides for circular dies equipped with suitable lugs or a suitably shaped die holder.

Figure 5:
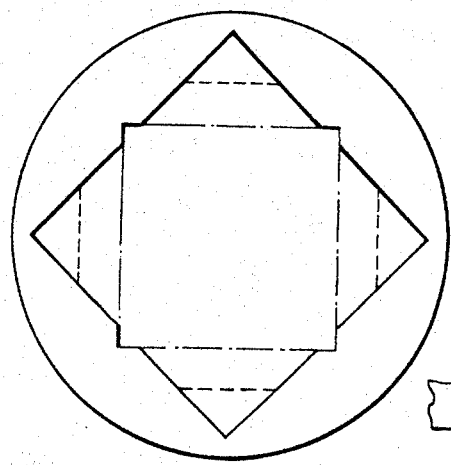
FIGURE 5 is a cross-sectional view of a rotary tool-locating member.

FIGURE 5 shows a cross-section of another tubular tool-locating member of the same general type. The internal cross-section of the example shown in FIGURE 5 is in the form of the common boundary of two superposed squares of different size, the smaller square being shown completed in chain dotted lines. It will be seen that an octagon, shown completed in broken lines will fit within the larger square.

The tool-locating member 13 is held in position in the frame 11 by the wire-race ball bearing 12 shown in FIGURE 2. Each wire forms a complete circle and has a shallow longitudinal trough ground in it, the cross-section of the trough being an arc having a radius about equal to that of the balls which run in the bearing. The wires are so arranged in the bearing 12 that the balls run in the troughs in the wires. The cross-sectional diameters of the two wires forming the inner race of the bearing 12 are larger than the cross-sectional diameters of the two wires forming the outer race. The four wires are angularly separated by ninety degree intervals about the centre of each ball.

To assemble the bearing 12, the two wires forming the outer race are placed in the positions shown in FIGURE 2, and the wire which abuts against the wormwheel 19 is placed in its position on the tool-locating member 13. The tool-locating member 13 is then shifted upwards on the frame 11, in relation to FIGURE 2, until the wormwheel 19 comes into contact with the frame 11. The balls can then be placed between the three wires in the bearing 12. The fourth wire is then located on the tool-locating member 13 and moved into position against the balls. Finally, the annular collar 13 is screwed on to the tool-locating member 13 until it is tight against the fourth wire. The collar 13 thus moves the wire races and the balls into the positions shown in FIGURE 2.

The use of wires of larger cross-sectional diameter for the inner race of the bearing 12 enables the balls to be assembled by passing them between the inner diameter of the outer wires and the seating diameter of the inner wires as described.

The tool-locating member 13 is open at both ends. Adjacent one end of the tool-locating member 13, a self-centering vice is secured to the frame 11 by a pin 56 and a circlip 57, and a slotted plate 58. The vice is capable of securing a workpiece against rotation and translation relative to the frame 11 and is shown in FIGURE 4 gripping a cylindrical pipe 59. The other end of the tool-locating member 13 is externally screw-threaded coaxially of itself. A screw-threaded body 60 is shown in FIGURES 1 and 2 to be in screwing engagement with the screw-threaded end of the tool-locating member 13. The screw-threads on the body 60 and the tool-locating member 13 are such that if the latter is rotated through a forward gear whilst the body 60 is restrained from rotating relative to the frame 11, the body 60 is drawn further on to the tool-locating member 13.

The body 60 is provided with abutment means in the form of a substantially annular surface 61 lying in a plane perpendicular to the axis of the screw-thread on the body 60. FIGURE 6 shows the surface 61 abutting against a die 62 fixed in a die holder 63 and the abutting faces being perpendicular to the axis of the die-holder ensure location of the die accurately for travel in the axial direction despite play between the die and die-holder. A plate 64 formed with an embouchure 65 is clamped between the die 62 and a ring 66 located in a groove in the die-holder 63. The embouchure 65 acts to maintain concentricity between the workpiece and the die even when the end of the workpiece is susbtantially out of square.

The body 60 is intended for use in screw-threading operations to apply the heavy pushing force initially necessary to engage a die on a workpiece. In such operations, therefore, the body 60 is partially screwed on to the tool-locating member 13 after the die has been inserted into the tool-locating member, and the workpiece to be screw threaded is so positioned in the self-centring vice that it holds the die against the surface 61 of the body 60 and is coaxial with the die. The tool-locating member 13 is then rotated through a forward gear, the body 60 being gripped and restrained by hand. The body 60 consequently advances on the tool-locating member and forces the die against the workpiece.

Preferably the screw-thread on the tool-locating member 13 and the body 60 is of the same pitch as the coarsest screw thread to be cut by means of the drive transmission, so that if the body 60 is prevented from rotating it will advance at the same rate as the coarsest thread to be cut, whilst if it is allowed to rotate under restraint at a slower rate than the tool-locating member 13, the body 60 can advance at the same rate as the finer screw-thread to be cut.

That surface of the body 60 which is manually gripped is provided with a rough finish to facilitate gripping.

FIGURE 7 illustrates the use of the body 60 in adapting the drive-transmission for use in driving a die which is too large to fit within the tool-locating member 13. A large die 70 is secured by two bolts 68 and 69 in an extension die holder 67 having a hexagonal driving end 71 which fits within the tool-locating member 13 and can bear against the surface 61 of the body 60. The driving end 71 is spaced from the location of the die 70 by the main body of the extension die holder 67 which is of sufficient length for full use to be made of the length of the tool-locating member 13 during a screw-threading operation. The main body of the extension die holder 67 is in the form of a hollow cylinder from which a trowel-shaped portion has been removed, as can be seen in FIGURE 8. The removal of the trowel-shaped portion together with the shape of the aperture in the body 60, shown in FIGURE 9, co-operate in enabling the body 60 to be slipped over the hexagonal driving end 71 and into the position shown in FIGURE 7.

Where it is desired to eliminate the manual effort of restraining the body 60, a construction such as is shown in FIGURE 10 can be used. In this construction a screw-threaded body 72 is provided with a friction clutch in which a torque arm 73 is held against a friction disc 74 by a Belleville spring washer 75. The slipping torque of the clutch is set to give the required maximum restraint to the body 72, whilst the torque arm 73 may be prevented from rotating by a pivoted stop arm 76 which can be rotated in a bearing 77 on the frame of the drive transmission to a storage position. It will be understood that the clutch may be of any alternative construction, such as a peripheral band brake; whilst the body 72 may comprise a threaded plug engaging an internal thread in the tool-locating member cut on circular lands relieved between the tool-engaging corners of the internal cross-section of the tool-locating member.

The body 72 is shown abutting a hexagonal die nut 78 which is projecting from the tool-locating member 13.

In some cases it may be desirable to use a screw-threaded body in the form of a pair of coaxial cylindrical tubes, a screw-thread being formed on the inner surface of the outer tube, and one end of the inner tube serving as abutment means. The tool-locating member of the drive transmission would in this case be externally screw threaded, the inner tube of the screw-threaded body advancing within the tool-locating member in operation.

In all cases, the screw-thread formed on the screw-threaded body and the tool-locating member must be of opposite hand to the screw thread to be cut on a workpiece. For example, where a right-hand screw-thread is to be cut on a workpiece, the screw thread on the tool locating member and the screw-threaded body must be a left-hand screw thread.

In order to provide convenient access to the recesses 23, 24, 25, 26 and 27 in all conditions of use, the frame 11 is provided with three substantially flat mounting faces 79, 80 and 81 on three of its sides. It will be seen from FIGURES 3 and 4 that the mounting faces 79, 80 and 81 are provided with slots 82 which are accessible from both within and without the frame 11. The slots 82 enable a mounting block to be bolted against any one of the mounting faces 79, 80 and 81. Alternatively, the frame may include clamping means or large threaded holes to permit the direct attachment of tubular supporting members.

In FIGURE 11 the drive transmission is shown with a mounting block 83 secured to its mounting face 80 and supported on two rigid leg members 84 and 85 fitted into the mounting block 83. The leg member 84 is coupled to a base member 86 by means of a T joint 87. It will be realised that alternative forms of base member can be used, for example the leg member 84 may be coupled to two straight sections by a Y joint.

A preferred form of the mounting block 83 is shown in FIGURE 12. The block 83 is provided with a pair of lugs 88 and 89 having holes 90 and 91 respectively for bolts. A cluster of four substantially cylindrical, screw-threaded holes 92, 93, 94 and 95 extend from one side of the block 83 to the mounting surface 96 of the block 83. The axes of the holes 92, 93, 94 and 95 are inclined to one another and their mouths lie at the corners of a quadrilateral.

The block 83 can be bolted on to any one of the mounting faces 79, 80 and 81 by bolts passing through the holes 90 and 91 and two of the slots 82 respectively, the two slots being formed in opposite edges of a mounting face. The leg members 84 and 85, each of which have a screw-thread at one end, can then be screwed into either the holes 92 and 94 or the holes 93 and 95 in the block 83.

In alternative embodiments of the mounting block in which only two inclined holes for leg members are provided, the block may be secured to a platform plate provided with slots coincident with mounting slots cut into the edges of the sides of the frame of a drive-transmission. The slots in the plate can be so arranged that square-headed bolts may be engaged in the mounting slots without being removed from the platform plate, whilst the square heads can be prevented from turning, when wing nuts on the bolts are tightened, by abutments on the frame beside the mounting slots.

Referring to FIGURE 11, the members 84, 85 and 86 may conveniently be of half-inch water pipe threaded on site by means of the drive transmission. It will be obvious that means other than screw threading may be used in securing the leg members in the holes in the block. When using a manual drive for the drive transmission, it is most convenient for the operator for stabilising the assembly to stand on the base member 86 with the drive transmission having the mounting block 83 bolted on the mounting face 81 so that the input shafts 14, 15, 16 and 17 are horizontal, whereby handle rotation is in a vertical plane.

The self-centring vice shown in FIGURE 4 has two arms 97 and 98 which can be rotated on the pin 56 by rotation of a screw 99 having two screw threads 100 and 101 of which the senses are opposite. The arms 97 and 98 are coupled to the screw 99 by trunnions 103 and 104 which are in screw-thread engagement with the screw threads 101 and 100 respectively and equidistant from the pin 56. The screw 99 is prevented from moving in its axial direction by the abutment of its head 102 and one end of the screw thread 101 on opposite sides of the plate 58. The screw 99 passes through a slot 105, best seen in FIGURE 1, in the plate 58 which permits the movement of the screw 99 towards and away from the pin 96 required when the angular separation of the arms 97 and 98 is altered. A lever 106 is provided for rotating the screw 99.

Referring to FIGURE 2, the arm 98 is bifurcated and the arm 97 is located between the prongs of the arm 98 at the pin 56. Two circlips 107 and 108 located in grooves on the pin 56 co-operate with the circlip 57 in securing the pin 56 and the arms 97 and 98. The pivoting hole in the arm 97 on the axis 56 is slightly elongated along the axis of the arm so that torsion on the workpiece will tend to displace the arm laterally and force the locating jaw against the workpiece.

In FIGURE 4 the arms 97 and 98 are shown angularly displaced from their respective fixed datum positions of closest approach in which the trunnions 103 and 104 are substantially at the ends of the screw threads 101 and 100 at the centre of the screw 99. The datum positions are fixed by virtue of the screw 99 being prevented from rotating about the pin 56. The screw 99 provides a continuous limited range of limits to the respective angular separations of the arms 97 and 98 from their datum positions. Clamping jaws 107 and 108 are formed on the arms 97 and 98 respectively. The profile of each jaw is in the form of a pair of lines diverging towards the other jaw. The diverging lines of the profile of each jaw are substantially such that, from any one of a plurality of points on an arc centred on a point 110 and passing through a fixed datum point 109, normals can be drawn to two points one on each line, equidistant from the point on the arc. The datum point 109 is a point on the axis of rotation of the tool-locating member 13, and the point 110 is a point on the axis of rotation of the arms 97 and 98. The axis of rotation of the tool-locating member 13 and that of the arms 97 and 98 are perpendicular to a plane containing the points 109 and 110. Also, the profiles of the jaws 107 and 108 are such that for a range of angular separation of the arms 97 and 98 a circle centred on the point 109 and touched by the divergent lines of the profile of one of the jaws is touched by the profile of the other jaw at a point which lies at the apex of a triangle whose base is the line joining the points of contact with the circle of the divergent lines of the said one jaw, none of the angles of the triangle being obtuse. This condition must be satisfied for the points of contact of the jaws on a cylindrical workpiece to include at least half the circumference of a cylindrical workpiece. Referring to FIGURE 13, if each of the four triangles drawn with apices 111, 112, 113 and 114 included an obtuse angle, then all the four points 111, 112, 113 and 114 would lie in an arc of less extent than a semi-circle, and therefore a cylindrical workpiece would not be secured by the jaws.

The form of the diverging lines for the jaws 107 and 108 can be obtained by a plotting technique after a decision has been made as to (a) the distance between the points 109 and 110,
(b) the diameters of workpiece to be clamped in the vice,
(c) the points on the circumference of the workpieces at which the jaws are to touch the workpieces, and
(d) the positions of the trunnions 103 and 104 on the screw 99 corresponding to the diameters of workpiece to be clamped.

Referring to FIGURE 14 there is shown a diagram for use in plotting the profiles of jaws for a vice similar to that shown in FIGURE 4.

Four circles 115, 116, 117 and 118 centred on the datum point 109 represent the circumferences of cylindrical workpieces of different diameters to be clamped in the self-centring vice. The profile of a first jaw to be rotated about an axis passing through the point 110 perpendicularly to the plane of the diagram is to touch the circles 115, 116, 117 and 118 at pairs of points 119, 121, 123 and 125.

Four lines 127 passing through the point 110 represent positions of a first datum line, which is in a first arm bearing the first jaw, joining the axis passing through the point 110 and the axis of a first trunnion coupling the first arm to a screw such as the screw 99. The positions *a, b, c* and *d* of the lines 127 correspond to the positions of the first datum line when the first jaw is touching the circles 115, 116, 117 and 118 respectively.

To obtain the profile of the first jaw, a reference line and a reference point on the reference line are marked on a sheet of tracing paper which is then laid over the diagram, the reference point being superposed on the point 110 and the reference line being superposed at the position *a* of the lines 127. A first pair of points is then marked on the tracing paper over the points 119. The tracing paper is then rotated clockwise about the point 110 until the reference line is superposed at the position *b* of the line 127. A second pair of points if then marked on the tracing paper over the points 121. It is a necessary condition that the first pair of points marked on the tracing paper be on or outside the circle 117 when the reference line is thus superposed at the position *b*. If this condition is not satisfied, the position *b* must be rotated clockwise about the point 110 until the condition can be satisfied.

The plotting procedure is continued until points corresponding to all the pairs of points 119, 121, 123 and 125 have been marked on the tracing paper. The lines on which the points thus obtained lie are the required diverging lines of the profile of the first jaw. The reference point on the tracing paper gives the position of the axis of rotation of the first arm relative to the diverging lines.

To obtain the profile of the second jaw, the plotting procedure is carried using the four lines 128 and the pairs of points 120, 122, 124, 126. The four lines 128 passing through the point 110 represent positions of a second datum line, which is in a second arm bearing the second jaw, joining the axis passing through the point 110 and the axis of a second trunnion coupling the second arm to the screw of the vice. The positions *a, b, c* and *d* of the lines 128 correspond to the positions of the second datum line when the first datum line is in its positions *a, b, c* and *d* respectively. If the positions *a, b, c* and *d* of the lines 128 are "mirror images" in the line joining the points 109 and 110, and the first and second trunnions are mounted on the screw at respective positions which are "mirror images" in the line 109–110; and if the screw threads engaging the trunnions are of equal pitch, and the axis of the screw is perpendicular to the line 109–110 then the first and second jaw profiles will be identical as shown for example in FIG. 13.

If it is required that the second jaw have a profile which touches the workpieces at one point only, then instead of the pairs of points 120, 122, 124 and 126 a set of single points is marked on the circles, the point on the circle 115 being the point of contact with the profile when the second datum line is in the position *a* of the line 128, and so on. There are in this case three points on each of the circles 115, 116, 117 and 118 respectively. The three points on each circle must satisfy the condition that the triangle having the three points at its apices does not include an obtuse angle. Preferably all the angles of the triangle are acute. The condition must be satisfied otherwise the jaws will not secure a cylindrical workpiece.

The two arms of a self-centring vice according to the present invention need not be pivoted on a common axis but can have respective axes. Where each arm has a respective axis, points on both axes must be used in the diagram for plotting the jaw profiles, lines corresponding to the lines 127 being drawn through the points representing a point on the axis of rotation of the first arm, and lines corresponding to the lines 128 being drawn through the point representing a point on the axis of rotation of the second arm. The points on the axes of rotation of the arms together with the datum point must lie in a plane to which the axes are perpendicular.

A self-centring vice according to the present invention is shown schematically in FIGURE 15 in which the two arms 97 and 98 are rotatably mounted on respective pins 56' and 56" which are rotatable at fixed locations in the frame (not shown) of the vice. The arms 97 and 98 can be rotated on the pins 56' and 56" by rotation of the screw 99 which has two screw threads 100" and 101' of which the senses are opposite. Trunnions 103 and 104 are in screw-thread engagement with the screw threads 101' and 100" respectively and serve to couple the arms 97 and 98 to the screw 99.

The screw 99 is prevented from moving in its axial direction by the abutment of the ends of the screw-threads 100" and 101' at the central portion of the screw 99 on opposite sides of a slotted plate 58' fixed on the frame of the vice. The screw 99 passes through the slot in the plate, the slot being so shaped as to permit the movement of the screw 99 towards and away from the pins 56' and 56" when the angular separation of the arms 97 and 98 is altered.

The arms 97 and 98 are shown angularly displaced from their respective fixed positions of closest approach in which the trunions 103 and 104 are substantially at the ends of the screw threads 101' and 100" at the central portion of the screw 99. The datum positions are fixed by virtue of screw 99 being prevented from rotating about the pins 56' and 56". The screw 99 provides a continuous limited range of limits to the respective angular separations of the arms 97 and 98 from their datum positions.

Clamping jaws 107' and 108" are formed on the arms 97 and 98 respectively. The profile of the jaw 107' is in the form of a pair of lines diverging towards the jaw 108". The diverging lines of the profile of the jaw 107' are so formed that, for a range of angular separation of the arm 97 from its datum position, a circle centred on a datum point 109 touches each line. (The profile of the jaws shown in FIGURE 15 are illustrative only). The profile of the jaw 108" can be obtained by a ploting technique in which the points corresponding to a set of single points on circles centred on a point representing the datum point 109 are marked on a sheet of tracing paper. Three points are marked on each of the circles, two being for the diverging lines of the profile of the jaw 107'. The three points on each circle must lie at the apices of a triangle of which none of the angles is obtuse. Also, the positions of the axes of the pins 56' and 56" relative to the datum point 109 must be marked on the diagram used in plotting the profiles, the tracing paper being rotated about the point representing the axis of the pin 56' when the profile of the jaw 107' is being plotted, and about the point representing the axis of the pin 56" when the profile of the jaw 108" is being plotted.

In alternative constructions of the self-centring vice of the present invention, the two arms may be rotated by respective hydraulic or pneumatic pistons arranged for motion in contrary directions in a cylinder fixed to the frame of the vice.

It will be realised that means for rotating the arms simultaneously towards each other in a self-centring vice according to the present invention can be coupled to each arm between the jaw on the arm and the pivot of the arm. Alternatively, each arm may be pivoted at a point between the jaw on the arm and the means for rotating the arms. Such constructions may be used where it is advantageous to be able to introduce long workpieces into the vice sideways instead of axially.

A further self-centring vice according to the present invention is shown schematically in FIGURE 15A in which the two arms 97 and 98 are rotatably mounted on trunnions 103A and 104A respectively. The trunnions 103A and 104A are in screw-threaded engagement with a screw 99 and rotation of the screw 99 causes the trunnions to translate in opposite directions along the screw 99. A bearing 58A fixed to the frame (not shown) of the vice

11 so secures the screw 99 as to prevent the axis of the screw from moving relative to the frame. Abutments 134 and 135 fixed to the frame co-operate with the screw 99 in limiting the angular separation of the arms 97 and 98 and causing teh arms 97 and 98 to rotate towards each other as the trunnions are separated from each other. The fixed positions of the bearing 58A and the abutments 134 and 135 established fixed datum positions of closest approach of the arms 97 and 98 to one another in which they are substantially parallel to one another and perpendicular to the screw 99.

Clamping jaws 107A and 108A on the arms 97 and 98 each have a profile in the form of a pair of lines diverging towards the other jaw. The diverging lines of each jaw are such that for a range of angular separation of the arms 97 and 98, a circle centred on a datum point 109 fixed relative to the frames touches the diverging lines. Also, a circle centred on the datum point 109 and touching the diverging lines of one of the jaws must touch the profile of the other jaw at a point such that the three points lie at the apices of a triangle none of the angles of which are obtuse.

In an alternative construction only one of the jaws may have a profile in the form of diverging lines. The profile of the other jaw must, however, satisfy the condition laid down relating to the three points on a circle centred on the datum point 109.

The profiles of jaws for a self-centering vice in which the arms rotate about translating pivots as in the example just described can be obtained by a plotting technique similar to that described hereinbefore with reference to FIGURE 14. However in this case a surface of an abutment, such as the abutment 134, provides reference positions relative to the datum point 109, and successive positions of the translating pivot of the arm should be marked on the plotting diagram, the profile of that part of the surface of the arm which bears against the surface of the abutment and the position of the axis of rotation of the arm relative thereto being drawn on the tracing paper initially.

FIGURE 16 shows in section part of a drive-transmission for screw-threading-tools which also comprises a saw-mechanism.

A guide 136 in the form of a handle is rotatably mounted on the frame 11 of the drive-transmission by means of a spigot 137, formed integrally with the handle, which fits rotatably in a socket 138 in the frame 11. A holder 139 is located in the guide 136 and can reciprocate in the guide 136. A saw 140 is secured in the holder 139 by means of a bolt 141 having a slot through which the saw 140 passes and a nut 142 (FIGURE 17) which is tightened on the bolt 141 to clamp the saw 140 between the bottom of the slot in the bolt and the wall of the holder.

A cam 143 with four lobes is screw-threaded on to one end of the tubular tool-locating member 13 of the drive-transmission. A cam follower in the form of a small roller 144 rotatably mounted on the holder 139 is held in contact with the periphery of the cam 143 by means of a helical spring 145 compressed between the holder 139 and the guide 136.

Referring to FIGURE 17 the saw 140 is shown resting on a cylindrical workpiece 146. It will be seen that a clockwise rotation of the tool-locating member 13 causes the holder 139 to reciprocate in the guide 136. Also, as the saw 143 lies above a broken line A–B, on rotating past the roller 144 each lobe of the cam 143 assists in maintaining the saw 140 in contact with the workpiece 146. Thus the saw presses against the workpiece during the cutting stroke of the reciprocation.

The cam 143 is secured on the tool-locating member 13 by a screw thread which serves also to engage a screw-threaded body as described hereinbefore and is locked in position by a thread-locking adhesive polymer such as "Loctite."

12

In alternative constructions of saw-mechanisms according to the present invention, in which a rotary member for rotating a workpiece is provided, a cam may be coupled to the rotary member by being clamped on to a workpiece which is rotated while being sawed through.

In an alternative construction the cam 143 may be a gearwheel and the cam-follower may be a meshing pinion mounted upon an eccentric axis thereby reciprocating the saw-holder 139 when the pinion is rotated by the gearwheel.

I claim:

1. A drive-transmission for screw-threading tools, comprising a frame, a bearing in the frame, a rotary tool-locating-member carried by the bearing, and a plurality of input shafts journalled in the frame and respectively associated with gearing to the tool-locating-member for rotation thereof, including a forward gear, a high-torque reversing gear and a high-speed reversing gear.

2. A drive-transmission for screw-threading tools comprising a frame, a bearing in the frame, and a tubular rotary tool-locating member having its internal cross-section substantially in the form of the common boundary of a plurality of superposed non-circular figures, the tool-locating member being carried by the bearing and associated with gearing for rotation thereof.

3. A drive-transmission for screw-threading tools comprising a frame, a bearing in the frame, a rotary hollow tool-driving member carried by the bearing, gearing for rotation of the tool-driving member, and a removable body in engagement with one end of the tool-driving member and having a rigid abutment means defining a plane perpendicular to the axis of the tool-driving member and facing the other end of the tool-driving member, the interior of the tool-driving member being shaped to enable tool means having corresponding external surfaces to slide axially within the tool-driving member during a screw-threading operation.

4. A drive-transmission as claimed in claim 3, wherein the said removable body is screw-threadedly engaged with one end of the tool-driving member.

5. A drive-transmission as claimed in claim 4, wherein the screw-thread is of opposite hand to the thread of the said tool means.

6. A drive-transmission as claimed in claim 3, including means for restraining motion of the said removable body.

7. A drive-transmission as claimed in claim 6, wherein the said restraining means is a peripheral band brake.

8. A drive-transmission for rotary tools, comprising a frame, a bearing in the frame, a rotary tool-driving member carried by the bearing, an input shaft journalled in the frame, gearing to the tool-driving member associated with the input shaft for rotation of the tool-driving member, a monolithic mounting block of metal, a plurality of means on the frame for securing the frame to the mounting block in a plurality of different positions, the frame being secured to the block in one position selected from the said plurality of positions, the mounting block having formed therein a first plurality of substantially cylindrical holes extending into the block and towards the face of the block immediately adjacent the frame, and a second plurality of rigid leg members engaged respectively in the holes, the holes being such that the leg members diverge from one another outwardly of the block.

9. A drive-transmission as claimed in claim 8, wherein there are four of the said holes, the four holes forming a cluster and extending into the block from one side thereof with their axes inclined to one another.

10. A drive-transmission as claimed in claim 8, wherein there is a pair of the said leg members, and a stabilising base member is provided on one of the leg members.

11. A drive-transmission for screw-threading tools comprising a frame, a bearing in the frame, a rotary tool-locating member carried by the bearing, gearing for rotation of the tool-driving member, and a self-centering work-piece clamp, the work-piece clamp having two arms mounted on the frame, each arm being rotatable in a plane to which the axis of the tool-locating member is substantially perpendicular, means mounted on the frame and engaged with the arms to rotate them relatively towards each other, a first clamping jaw on one of the arms, and a second clamping jaw on the other arm, the first clamping jaw having a profile in the form of a pair of lines diverging towards the second jaw, the profile being such that for any relative position of the arms the center of a circle touching the profile of the second jaw and the said lines lies on the axis of the tool-locating member, the said axis being perpendicular to the plane of the circle.

12. A drive-transmission as claimed in claim 11, wherein at least one of the said arms is mounted to be slidable in the said plane relative to the frame to permit binding action by the jaw of the said one arm on a work-piece in a screw-threading operation.

13. A drive-transmission as claimed in claim 11, wherein one of the jaws is mounted to bind on a work-piece during a screw-threading operation.

14. A drive-transmission as claimed in claim 11, wherein the arms are pivoted at separate points on the frame.

15. A drive-transmission as claimed in claim 11, wherein the said means to rotate the arms comprises a screw having two screw threads of which the senses are opposite, and two trunnions respectively screw-threadedly engaged with the two screw-threads, each trunnion being coupled to a respective one of the arms.

References Cited

UNITED STATES PATENTS

| | | | |
|---|---|---|---|
| 253,996 | 2/1882 | Forbes | 10—89 X |
| 458,084 | 8/1891 | Weeks | 10—89 |
| 576,873 | 2/1897 | Melhorn | 10—89 |
| 659,975 | 10/1900 | Jerauld | 10—89 |
| 2,374,176 | 4/1945 | Cook | 10—89 |
| 2,880,430 | 4/1959 | Tinsman | 10—89 |
| 2,991,490 | 7/1961 | Pirone | 10—89 |
| 3,132,359 | 5/1964 | Halligan | 10—89 |

HARRISON L. HINSON, *Primary Examiner.*

U.S. Cl. X.R.

10—101; 82—46